(12) United States Patent
Peng et al.

(10) Patent No.: US 12,177,152 B2
(45) Date of Patent: Dec. 24, 2024

(54) INFORMATION TRANSMISSION METHOD AND TERMINAL AND NON-TRANSITORY COMPUTER-READABLE STORAGE MEDIUM

(71) Applicant: VIVO MOBILE COMMUNICATION CO., LTD., Guangdong (CN)

(72) Inventors: Shuyan Peng, Guangdong (CN); Huaming Wu, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 264 days.

(21) Appl. No.: 17/667,780

(22) Filed: Feb. 9, 2022

(65) Prior Publication Data

US 2022/0271892 A1 Aug. 25, 2022

Related U.S. Application Data

(63) Continuation of application No. PCT/CN2020/102098, filed on Jul. 15, 2020.

(30) Foreign Application Priority Data

Aug. 9, 2019 (CN) .......................... 201910736219.0

(51) Int. Cl.
H04L 5/00 (2006.01)
(52) U.S. Cl.
CPC .......... H04L 5/0051 (2013.01); H04L 5/0064 (2013.01)
(58) Field of Classification Search
None
See application file for complete search history.

(56) References Cited

U.S. PATENT DOCUMENTS

| | | | |
|---|---|---|---|
| 2018/0176892 A1* | 6/2018 | Kim | H04W 52/04 |
| 2020/0260472 A1* | 8/2020 | Ganesan | H04W 4/46 |
| 2020/0351857 A1* | 11/2020 | Bharadwaj | H04L 5/0053 |
| 2022/0085923 A1* | 3/2022 | Ye | H04L 1/1607 |
| 2022/0191847 A1* | 6/2022 | Hong | H04W 72/25 |

FOREIGN PATENT DOCUMENTS

| | | |
|---|---|---|
| JP | 2017516361 A | 6/2017 |
| WO | 2017171519 A1 | 10/2017 |
| WO | 2017178993 A1 | 10/2017 |

OTHER PUBLICATIONS

Huawei, "Sidelink physical layer structure for Nr V2X", 3GPP TSG RAN WGI Meeting #97, RI-1906007, Reno, USA, May 13-17, 2019.
Ericsson, "On 2-stage PSCCH-1 design", 3GPP TSG-RAN WG1 Meeting #94bis, Tdoc R1-1811607, Chengdu, China, Oct. ath-12, 2018.

(Continued)

Primary Examiner — Diane L Lo
(74) Attorney, Agent, or Firm — Price Heneveld LLP

(57) ABSTRACT

An information transmission method and a terminal are provided. The method includes: transmitting sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

20 Claims, 12 Drawing Sheets

(56) References Cited

OTHER PUBLICATIONS

Ericsson, "On 2-stage PSCCH design," R1-1813648, 3GPP TSG-RAN WG1 Meeting #95, Nov. 12-16, 2018, Spokane, Washington, USA.

Huawei, Hisilicon, "Design and contents of PSCCH and PSFCH", R1-1906596, 3GPP TSG RAN WG1 Meeting #97, May 13-17, 2019, Reno, USA.

Samsung, "Feature lead summary #4 for 7.2.4.1 Physical layer structure for sidelink", R1-1907924, 3GPP TSG RAN WG1 #97 Meeting, May 13-17, 2019, Reno, USA.

Vivo, "Physical layer structure for NR sidelink", R1-1908148, 3GPP TSG RAN WG1 #98 Meeting, Aug. 26-30, 2019, Prague, CZ.

Qualcomm Incorporated, Considerations on Physical Layer aspects of NR V2X, 3GPP TSG RAN WG1 Meeting #96bis, R1-1905008, Xian, China, Apr. 8-Apr. 12, 2019.

Ericsson, PHY layer structure for NR sidelink, 3GPP TSG-RAN WG1 Meeting #96bis, R1-1905475, Xi'an, China, Apr. 8-12, 2019.

Ericsson, PHY layer structure for NR sidelink, 3GPP TSG-RAN WG1 Meeting #97, R1-1907134, Reno, Nevada US May 13-17, 2019.

\* cited by examiner

INFORMATION TRANSMISSION METHOD AND TERMINAL AND NON-TRANSITORY COMPUTER-READABLE STORAGE MEDIUM

CROSS-REFERENCE TO RELATED APPLICATIONS

This application is a continuation application of PCT International Application No. PCT/CN2020/102098 filed on Jul. 15, 2020, which claims priority to Chinese Patent Application No. 201910736219.0, filed in China on Aug. 9, 2019, which are incorporated in their entireties by reference herein.

TECHNICAL FIELD

This disclosure relates to the field of communications technologies, and in particular, to an information transmission method and a terminal.

BACKGROUND

As shown in FIG. 1, currently a long term evolution (LTE) system may support sidelink for direct data transmission between terminal user equipments (UE) not through a network device.

Sidelink transmission mainly includes the following transmission modes: broadcast, groupcast, and unicast. Unicast, as its name implies, is a one-to-one transmission. Groupcast is a one-to-many transmission. Broadcast is also a one-to-many transmission, however, in broadcasting, there is no concept that UEs belong to a same group. UE sends sidelink control information (SCI) over a physical sidelink control channel (PSCCH), to schedule transmission of a physical sidelink shared channel (PSSCH) for data transmission.

Design of LTE sidelink is suitable for specific public safety incidents (for example, emergency communication at sites of fires, earthquakes, or other disasters), vehicle to everything (V2X) communication, or the like. Vehicle to everything communication includes various services, for example, basic security communication, advanced driving (self-driving), platooning, sensor extension, and the like. Because LTE sidelink only supports broadcast communications, it is mainly used for basic security communications. Other advanced V2X services with strict QoS requirements in terms of delay, reliability, and the like will be supported through new air NR sidelink.

However, in current NR sidelink, unicast and groupcast support a hybrid automatic repeat request (HARQ) feedback mechanism, channel state information (CSI) measurement and other mechanisms, but HARQ feedback mechanism is not supported in broadcast, which results in SCI for scheduling unicast or groupcast transmission much greater than SCI for scheduling broadcast transmission. If SCI for broadcast is padded with 0 or 1 to reach a size of the SCI for unicast/groupcast, performance of the SCI for broadcast can be reduced. If the SCI for broadcast is not padded, complexity in detecting SCI of different sizes by a receiving end can be increased.

In addition, in unicast and groupcast, reporting a measured CSI report by the terminal to a transmitting end UE may be supported. CSI report information is part of sidelink feedback control information (SFCI), but currently there is no specific design on SFCI transmission on a channel.

SUMMARY

According to a first aspect, an embodiment of this disclosure provides an information transmission method, including:

transmitting sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

According to a second aspect, an embodiment of this disclosure further provides a terminal, including:

a transmission module, configured to transmit sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

According to a third aspect, an embodiment of this disclosure further provides a terminal, including a processor, a memory, and a computer program stored in the memory and capable of running on the processor, where when the computer program is executed by the processor, the steps of the foregoing information transmission method are implemented.

According to a fourth aspect, an embodiment of this disclosure further provides a computer-readable storage medium, where the computer-readable storage medium stores a computer program, and when the computer program is executed by a processor, the steps of the foregoing information transmission method are implemented.

DESCRIPTION OF EMBODIMENTS

To make the to-be-resolved technical problems, technical solutions, and advantages of this disclosure clearer, the following provides detailed descriptions with reference to the accompanying drawings and specific embodiments.

Figure 1:
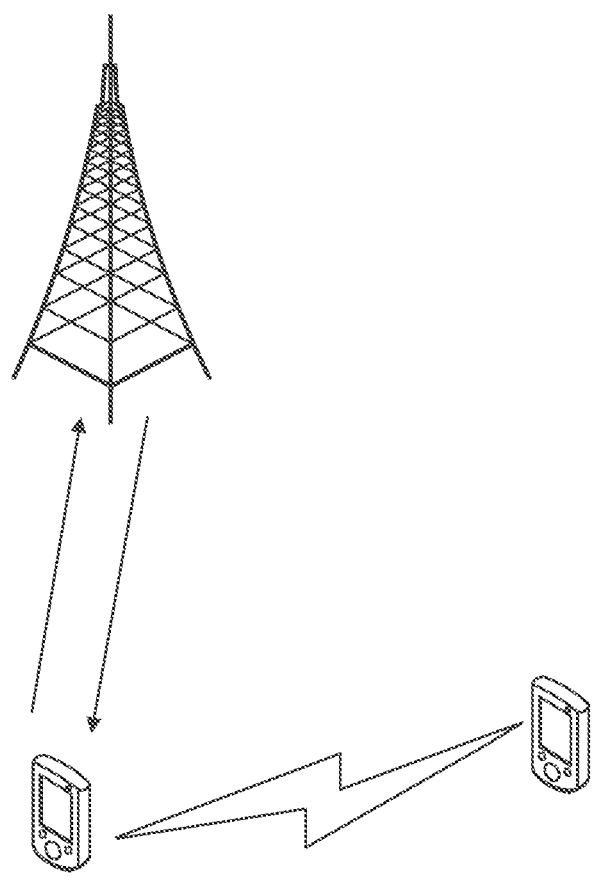
FIG. 1 is a schematic diagram of data transmission supported by a terminal.
Figure 2:
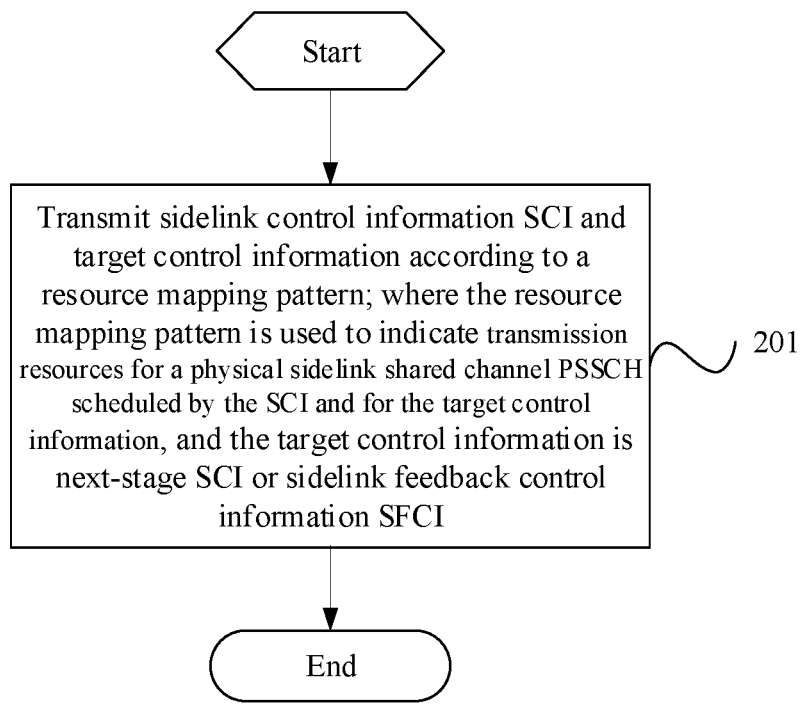
FIG. 2 is a schematic flowchart of an information transmission method according to an embodiment of this disclosure.

As shown in FIG. 2, an information transmission method according to an embodiment of this disclosure includes:

Step 201. Transmit sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

In the foregoing step, a terminal to which the method in this embodiment of this disclosure is applied may transmit SCI and target control information (next-stage SCI or SFCI) according to a resource mapping pattern, where the resource mapping pattern is used to indicate a PSSCH scheduled by the SCI and a transmission resource for the target control information, thereby implementing transmission of two-stage SCI or SFCI.

The terminal to which the method in this embodiment of this disclosure is applied may be a transmitting terminal or a receiving terminal.

It should be known that in this embodiment, the PSSCH scheduled by the SCI may be scheduled by one-stage SCI, or by two-stage SCI, that is, jointly scheduled by the SCI and the next-stage SCI. Optionally, in the resource mapping pattern, mapping of the target control information starts in time domain from a first location and starts in frequency domain from a second location; where the first location and/or the second location is determined based on at least one of the following information:

location of a PSSCH demodulation reference signal DMRS;
transmission configuration parameter;
number of layers for a PSSCH;
configuration of a DMRS in use;
configuration information for SFCI;
transmitted service type;
resource assigned for a PSSCH; and
resource configuration for SCI.

The location of a PSSCH DMRS is:

a location of the N-th DMRS or the N-th DMRS set of the PSSCH, where N is an integer greater than or equal to 1; or a location of a front-loaded DMRS in the PSSCH.

The transmission configuration parameter includes at least one of the following: number of layers, payload, and code rate.

For mapping of the next-stage SCI, the transmission configuration parameter corresponds to at least one of the number of layers for next-stage SCI, payload, and code rate; and for mapping of the SFCI, the transmission configuration parameter corresponds to at least one of the number of layers for SFCI, payload, and code rate.

The configuration of a DMRS in use includes at least one of the following: DMRS type, number of symbols, and multiplexing mode.

In this specification, the DMRS in use is a DMRS used for demodulation of target control information (next-stage SCI or SFCI). Its multiplexing mode includes but is not limited to code division multiplexing CDM and frequency division multiplexing FDM. The DMRS type may be type 1 or type 2, and the number of symbols may be 1 symbol or 2 symbols.

The configuration information for SFCI includes: whether SFCI is carried.

In a case that SFCI is carried, the configuration information for SFCI further includes: a transmission resource for SFCI and/or a size of information carried by SFCI.

In this specification, whether SFCI is carried may be explicitly indicated by specific information, or implicitly indicated. There are many specific implicit manners. For example, Nbit is used to indicate a transmission resource for SFCI or an information size of the SFCI. If all bits are 0s (indicated by one codepoint), it means that no SFCI is carried; and if not all bits are 0s, it means that the SFCI is carried and a transmission resource for SFCI corresponding to the information is indicated.

The transmitted service type includes: groupcast, unicast, or broadcast.

The resource assigned for a PSSCH includes a frequency-domain resource assigned for the PSSCH and/or a time-domain resource assigned for the PSSCH.

In this specification, the frequency-domain resource assigned for the PSSCH may be a bandwidth, a physical resource block PRB, or a sub-channel. The time-domain resource assigned for the PSSCH may be a symbol, a time slot, a sub-frame, or a frame.

Optionally, the location of a PSSCH DMRS is indicated by SCI, configured by a terminal using radio resource control RRC, predefined by a protocol, configured by a network using downlink control information DCI, configured by a network using RRC, or pre-configured by a network.

The transmission configuration parameter is indicated by SCI, configured by a terminal using RRC, predefined by a protocol, configured by a network using DCI, configured by a network using RRC, or pre-configured by a network.

The number of layers for a PSSCH is indicated by SCI, configured by a terminal using RRC, predefined by a protocol, configured by a network using DCI, configured by a network using RRC, or pre-configured by a network.

The configuration of a DMRS in use is indicated by SCI, configured by a terminal using RRC, predefined by a protocol, configured by a network using DCI, configured by a network using RRC, or pre-configured by a network.

The configuration information for SFCI is indicated by SCI, configured by a terminal using RRC, predefined by a protocol, configured by a network using DCI, configured by a network using RRC, or pre-configured by a network.

The transmitted service type is indicated by SCI, configured by a terminal using RRC, predefined by a protocol, configured by a network using DCI, configured by a network using RRC, or pre-configured by a network.

The resource assigned for a PSSCH is indicated by SCI, configured by a terminal using RRC, predefined by a protocol, configured by a network using DCI, configured by a network using RRC, or pre-configured by a network.

In this way, the foregoing information for determining the first location and/or the second location, except the resource configuration for SCI, is indicated by SCI, configured by a terminal using radio resource control RRC, predefined by a protocol, configured by a network using downlink control information DCI, configured by a network using RRC, or pre-configured by a network.

In addition, transmission of the target control information (next-stage SCI or SFCI) is not limited to a single layer. Therefore, optionally, in the resource mapping pattern, mapping of the target control information at a target layer starts in time domain from a first location and starts in frequency domain from a second location; where the target layer is a single layer or multiple layers.

Herein, in the resource mapping pattern, the next-stage SCI or SFCI is mapped to the target layer, completing the corresponding single-layer or multiple-layer transmission.

The target layer is predefined or indicated by the SCI.

Certainly, the target layer may alternatively be indicated by DCI, or pre-configured, or configured by a network. Specifically, the SCI indicates the target layer, which is implemented by indicating the number of layers and/or layer index mapped by the next-stage SCI or SFCI in the SCI.

And optionally, the number of layers for a target layer is predefined or indicated by the SCI, and related to the number of layers for a PSSCH or a physical sidelink control channel PSCCH.

For example, the number of layers for a target layer indicated in the SCI is the same as the number of layers for a PSSCH, or the number of layers for a target layer is predefined as one layer.

Certainly, in the resource mapping pattern, a time-first or frequency-first manner may be selected for mapping of the target control information.

Optionally, in the resource mapping pattern, mapping of the target control information starts in time domain from a symbol at which the N-th DMRS or N-th DMRS set or front-loaded DMRS of the PSSCH is located, or from the L-th symbol after a symbol at which the N-th DMRS or N-th DMRS set or front-loaded DMRS of the PSSCH is located, and starts in frequency domain from the M-th physical resource block PRB of PRBs assigned for the PSSCH; where M is an integer greater than or equal to 1, and L is an integer greater than or equal to 1.

In this way, the first location is a symbol at which the N-th DMRS of the PSSCH is located, or the L-th symbol after the symbol at which the N-th DMRS of the PSSCH is located; or a symbol at which the N-th DMRS set is located, or the L-th symbol after a symbol at which the N-th DMRS set is located; or a symbol at which the front-loaded DMRS is located, or the L-th symbol after a symbol at which the front-loaded DMRS is located. The second location is the M-th PRB of the PRBs assigned for the PSSCH. In this way, in time domain of the target layer, mapping of the target control information starts from a symbol at which the N-th DMRS or N-th DMRS set or front-loaded DMRS is located, or from the L-th symbol after a symbol at which the N-th DMRS or N-th DMRS set or front-loaded DMRS is located. In frequency domain of the target layer, mapping is performed from the M-th PRB of the PRBs assigned for the PSSCH.

A value of M may refer to an index of a PRB with a highest index or a lowest index in the PRBs assigned for the PSSCH which, or may refer to an index of an edge PRB in a target frequency-domain range (a PRB with a largest or a lowest index in the range), and the target frequency-domain range is determined based on a size of frequency-domain resources to be occupied by next-stage SCI or SFCI. For example, if the next-stage SCI or SFCI needs to occupy 50 PRBs, the target frequency-domain range is 50 PRBs in the middle of 100 PRBs assigned for the PSSCH (in the center of a bandwidth assigned for the PSSCH).

Optionally, in the resource mapping pattern, mapping of the target control information starts in time domain from the P-th symbol after the SCI and starts in frequency domain from the Q-th PRB of the SCI; where Q is an integer greater than or equal to 1, and P is an integer greater than or equal to 1.

Herein, the first location is the P-th symbol after the SCI, and the second location is the Q-th PRB of the SCI. In time domain of the target layer, mapping of the next-stage SCI or SFCI starts from the P-th symbol after the SCI. In frequency domain of the target layer, mapping starts from the Q-th PRB of the SCI.

Optionally, in the resource mapping pattern, mapping of the target control information starts in time domain from the first available symbol, or the first available symbol not carrying DMRS, assigned for the PSSCH.

Herein, the first location is the first available symbol, or the first available symbol not carrying DMRS, assigned for the PSSCH. In time domain of the target layer, mapping of the target control information starts from the first available symbol, or the first available symbol not carrying DMRS, assigned for the PSSCH. In this case, the second location may be the M-th PRB of the PRBs assigned for the PSSCH. The value of M is described above, and details are not described herein again.

In addition, in a mapping process of next-stage SCI in two-stage SCI, because there may be transmission of SFCI, optionally, in the resource mapping pattern, in a case that SFCI is carried, rate matching or puncturing is performed on a location of the SFCI during mapping of the next-stage SCI.

For example, if SFCI is configured and a resource is reserved for the SFCI according to a network configuration, rate matching is performed according to the reserved resource for SFCI during mapping of the next-stage SCI. Certainly, puncturing may be alternatively performed on a location of the SFCI during mapping of the next-stage SCI.

It should also be known that in unicast and groupcast, the terminal may need to perform measurement reporting. Therefore, optionally, in a case that the transmitted service type is groupcast or unicast, in the resource mapping pattern, rate-matching or puncturing is performed on the location of the SFCI during mapping of the next-stage SCI.

For broadcast transmission, mapping of the next-stage SCI or SFCI may be not performed.

It should also be understood that in this embodiment, optionally, the target control information is correspondingly provided with configurations of one or more DMRSs, where
   when the target control information is correspondingly
      provided with configurations of a plurality of DMRSs,
      a configuration of a DMRS in use is predefined or
      determined based on the SCI.

The configuration of a DMRS for demodulating the target control information can be set flexibly, and may be one configuration, or may be a plurality of configurations. To make demodulation clearer, when there are configurations of a plurality of DMRSs, a configuration of a DMRS in use may be predefined, or indicated by SCI, or determined by a network based on an RRC indication, by a network based on an DCI indication, or by a terminal based on an RRC indication, thereby performing demodulation of the target control information with the determined configuration of a DMRS.

A configuration of a DMRS used by the target control information is predefined or indicated by the SCI, different from a configuration of a PSSCH DMRS.

In this way, the configuration of a DMRS predefined or indicated by SCI may be specific information about the configuration of the DMRS, or may directly indicate to use the configuration of the PSSCH DMRS.

The configuration of the DMRS used by the target control information is the same as the configuration of the PSSCH DMRS, which means that the target control information shares the configuration of the PSSCH DMRS. For example, the target control information reuses the first DMRS or front-loaded DMRS or the first DMRS set of the PSSCH; or, the target control information reuses a DMRS overlapping that of the PSSCH; or, a time-domain density of the DMRS used by the target control information is the same as a time-domain density of the PSSCH DMRS.

Optionally, a configuration of a PSSCH DMRS and/or the number of layers for a PSSCH is indicated in the SCI or the next-stage SCI.

In this way, the configuration of a PSSCH DMRS and/or the number of layers for a PSSCH can be learned through the SCI or through the next-stage SCI.

In this embodiment, optionally, a ratio of an energy per resource element EPRE of the target control information to an EPRE of a DMRS in use is determined based on at least one of the following information:
 type of the DMRS in use;
 multiplexing mode of the DMRS in use;
 number of code division multiplexing CDM groups of the DMRS in use;
 number of layers for the target control information;
 number of layers for the PSSCH;
 time-frequency resource location of the PSSCH; and
 mapping mode of data on the PSSCH.

When a ratio beta of an EPRE of the target control information to an EPRE of the DMRS in use is related to the multiplexing mode of the DMRS in use:
 (a) if the multiplexing mode of the DMRS in use is 1-DM, the beta is 0 dB (that is, the EPRE of the target control information is equal to the EPRE of the DMRS in use); and
 (b) if the multiplexing mode of the DMRS in use is CDM, the beta is 3 dB (that is, the EPRE of the target control information is twice of the EPRE of the DMRS in use), or the beta is 4.77 dB (that is, the EPRE of the target control information is triple of the EPRE of the DMRS in use).

When a ratio beta of an EPRE of the target control information to an EPRE of the DMRS in use is related to the multiplexing mode of the DMRS in use, the number of layers for the target control information, and the number of layers for the PSSCH:
 (a) if the multiplexing mode of the DMRS in use is FDM and the number of layers for next-stage SCI is equal to the number of layers for a PSSCH, the EPRE of the target control information is half of the EPRE of the DMRS in use;
 (b) if the multiplexing mode of the DMRS in use is FDM and the number of layers for next-stage SCI is less than the number of layers for a PSSCH, the EPRE of the target control information is equal to the EPRE of the DMRS in use;
 (c) if the multiplexing mode of the DMRS in use is CDM and the number of layers for next-stage SCI is equal to the number of layers for a PSSCH, the EPRE of the target control information is equal to the EPRE of the DMRS in use; and
 (d) if the multiplexing mode of the DMRS in use is CDM and the number of layers for next-stage SCI is less than the number of layers for a PSSCH, the EPRE of the target control information is twice of the EPRE of the DMRS in use.

When a ratio beta of an EPRE of the target control information to an EPRE of the DMRS in use is related to the multiplexing mode of the DMRS in use, the number of layers for the target control information, the number of layers for the PSSCH, and the mapping mode of data on the PSSCH:
 (a) if the multiplexing mode of the DMRS in use is 1-DM, the number of layers for next-stage SCI is less than the number of layers for the PSSCH, and data of the PSSCH is rate-matched according to a resource for the target control information, the EPRE of the target control information is equal to the EPRE of the DMRS in use;
 (b) if the multiplexing mode of the DMRS in use is 1-DM, the number of layers for next-stage SCI is less than the number of layers for the PSSCH, and data of the PSSCH is punctured according to a resource for the target control information, the EPRE of the target control information is half of the EPRE of the DMRS in use;
 (c) if the multiplexing mode of the DMRS in use is CDM, the number of layers for next-stage SCI is less than the number of layers for the PSSCH, and data of the PSSCH is rate-matched according to a resource for the target control information, the EPRE of the target control information is twice of the EPRE of the DMRS in use; and
 (d) if the multiplexing mode of the DMRS in use is CDM, the number of layers for next-stage SCI is less than the number of layers for the PSSCH, and data of a PSSCH is punctured according to a resource for the target control information, the EPRE of the target control information is equal to the EPRE of the DMRS in use.

With reference to specific scenarios, the following describes application of the method of an embodiment of this disclosure in a case of jointly scheduling a PSSCH by two-stage SCI, where SCI is denoted as the first SCI, and next-stage SCI is denoted as the second SCI.

Scenario 1: Time domain resources for the first SCI predefined by a protocol are a second symbol and a third symbol. The first SCI starts from the second symbol and is mapped onto assigned available resources in time-first manner. A pattern of a PSSCH DMRS predefined by a protocol/configured by a network is 1-symbol DMRS, type 1 configuration. For example, the DMRS used by the second SCI is the first DMRS of the PSSCH.

Figure 3:
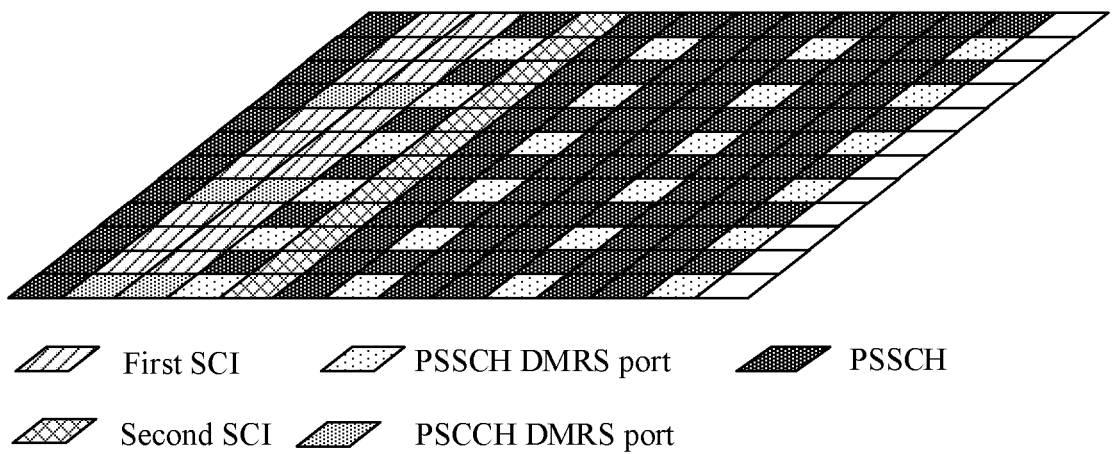
FIG. 3 is a first schematic application diagram of a method according to an embodiment of this disclosure.
Figure 4:
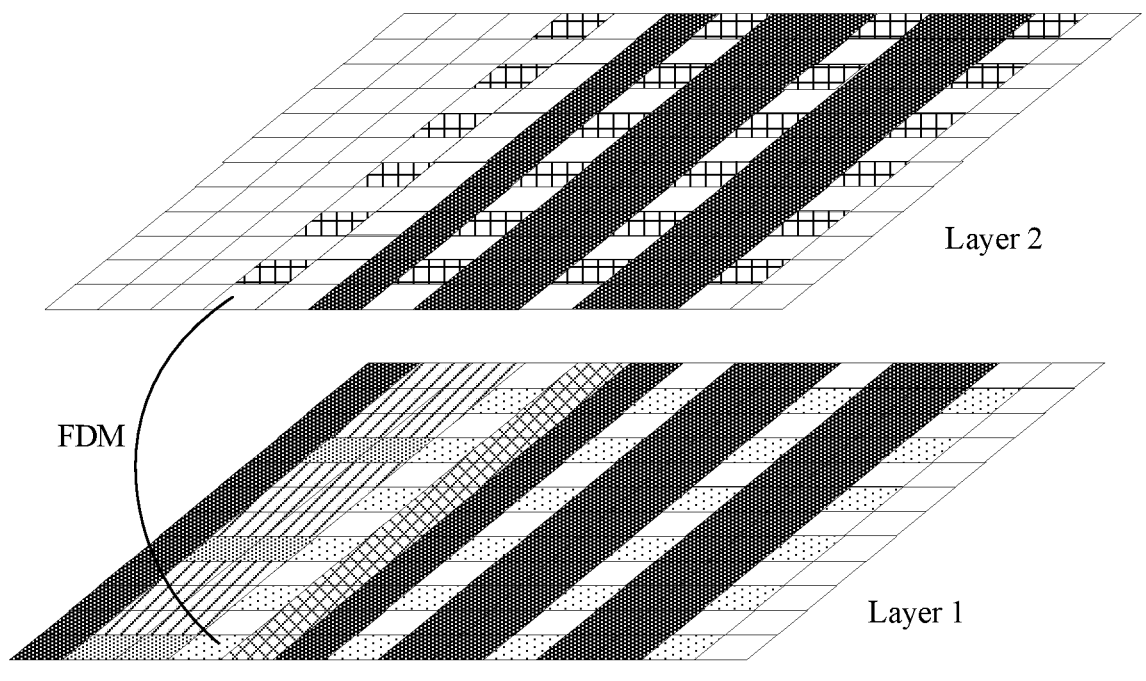
FIG. 4 is a second schematic application diagram of a method according to an embodiment of this disclosure.
Figure 5:
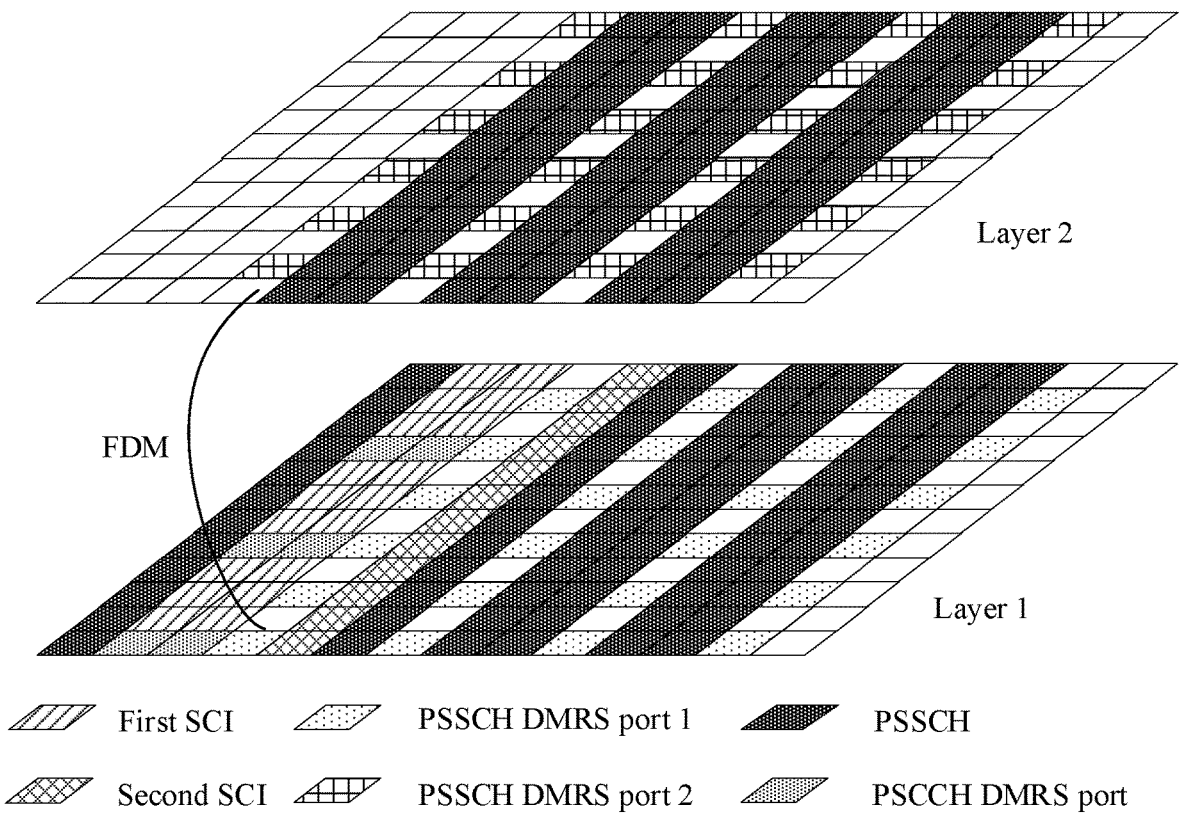
FIG. 5 is a third schematic application diagram of a method according to an embodiment of this disclosure.

When it is determined that the first location is a symbol next to a first DMRS configured for the PSSCH, mapping of the second SCI starts from the symbol next to the first DMRS configured for the PSSCH, and the mapping is performed on an associated DMRS port/PSSCH layer (for example, layer 1) predefined/pre-configured by a network.
 (a) In a case of single-port transmission as shown in FIG. 3, the PSSCH DMRS is mapped in a comb 2 fashion. Mapping of data on the PSSCH starts from a symbol at which a first DMRS of the PSSCH is located, and rate-matching is performed on a location of the second SCI. A ratio beta of the EPRE of the second SCI to the EPRE of the PSSCH DMRS is 0 dB.
 (b) In a case of two-port transmission as shown in FIG. 4 or FIG. 5, and FDM mapping used for a two-port DMRS of the PSSCH,
  i. Rate-matching or puncturing is performed on the PSSCH for time-frequency resources for the second SCI (as shown in FIG. 4). To be specific, in a case that the second SCI is transmitted only at a single layer, no PSSCH data is mapped onto time-frequency resources (that is, REs) corresponding to the SCI at the two layers of PSSCH. In this example, the second SCI is mapped only onto the fifth symbol of layer 1, and no data of the PSSCH is mapped onto the fifth symbols of both layer 1 and layer 2. A ratio beta of the EPRE of the second SCI to the EPRE of the PSSCH DMRS is 0 dB, or ii. Rate-matching or puncturing is performed on the PSSCH for time-frequency resources at a layer mapped by the second SCI (as shown in FIG. 5). To be specific, in a case that the second SCI is transmitted only at a single layer, the second SCI and PSSCH are encoded, bit interleaved and/or concatenated, then modulated, and the like, and the modulated information is mapped onto two layers, so that the second SCI is mapped onto an associated PSSCH layer (layer one)/DMRS port. In this example, the second SCI is mapped only on the fifth symbol of layer 1, and there is data of the PSSCH mapped on the fifth symbol of layer 2. The EPRE of the second SCI is half of the EPRE of the PSSCH DMRS. Certainly, based on a payload size, the second SCI may be fully mapped on the fifth symbol, may occupy only part of the resource, or may need to be mapped onto the sixth symbol or more symbols, and details are not described herein.

In this scenario, the design rules ensure that a DMRS power of PSSCH DMRS port 1 used by a receiving-side terminal to demodulate the second SCI has nothing to do with the number of layers for the PSSCH, and a symbol location of the second SCI has nothing to do with the number of layers for the PSSCH. Therefore, a configuration of a PSSCH DMRS can be carried in the second SCI.

The receiving-side terminal, on PSSCH DMRS port 1, starts to monitor the second SCI from the fifth symbol, uses the first DMRS to demodulate the second SCI, obtains the configuration of a PSSCH DMRS and/or the number of layers for a PSSCH, and demodulates the PSSCH according to the configuration of the PSSCH DMRS and a predefined configuration.

Scenario 2: Time domain resources for the first SCI pre-configured by a network are a second symbol and a third symbol. The first SCI starts from the second symbol and is mapped onto assigned available resources in time-first manner. A pattern of a PSSCH DMRS predefined by a protocol/configured by a network is 1-symbol DMRS, type 1 configuration. The configuration of a PSSCH DMRS and/or the number of layers for a PSSCH is indicated in the first SCI. A DMRS used by the second SCI is the first DMRS of the PSSCH.

When it is determined that the first location is a symbol at which a first DMRS configured for the PSSCH is located, mapping of the second SCI starts from the symbol at which the first DMRS configured for the PSSCH is located, and the mapping is performed on an associated DMRS port/PSSCH layer (for example, layer 1) predefined/pre-configured by a network.

Figure 6:
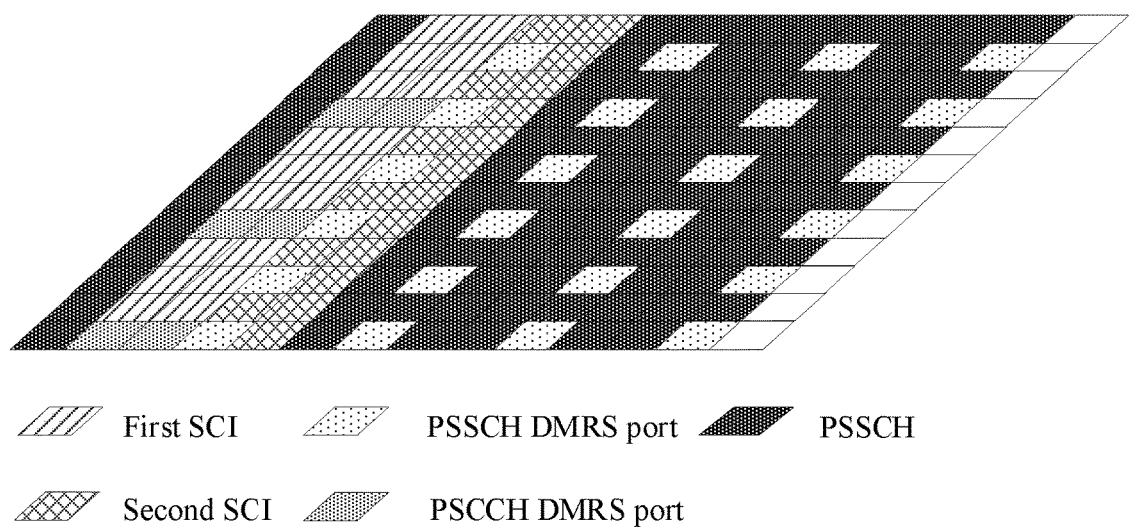
FIG. 6 is a fourth schematic application diagram of a method according to an embodiment of this disclosure.

(a) In a case of single-port transmission as shown in FIG. 6, the PSSCH DMRS is mapped in a comb 2 fashion. Transmission of the PSSCH starts from a symbol next to the symbol at which a first DMRS of the PSSCH is located, and is rate-matched or punctured according to the second SCI. A ratio beta of the EPRE of the second SCI to the EPRE of the PSSCH DMRS is 0 dB.

Figure 7:
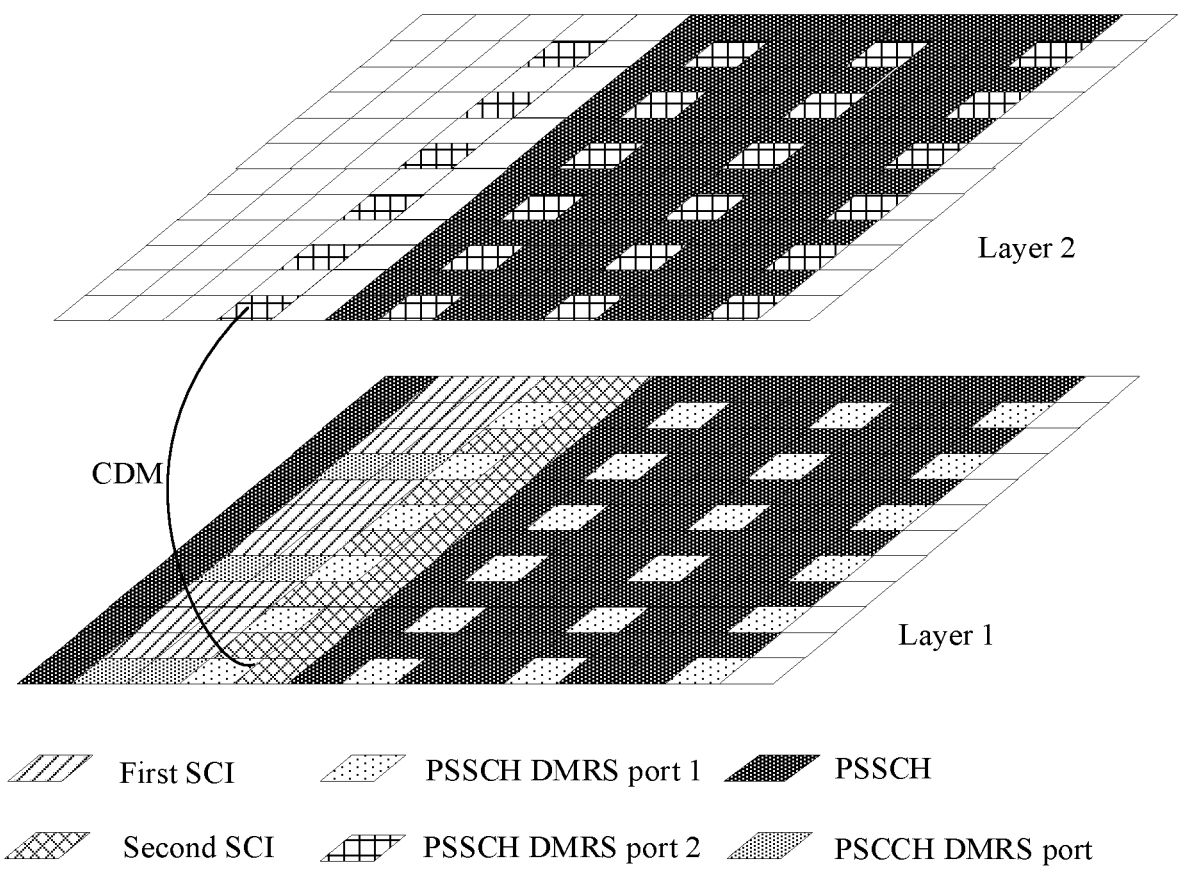
FIG. 7 is a fifth schematic application diagram of a method according to an embodiment of this disclosure.
Figure 8:
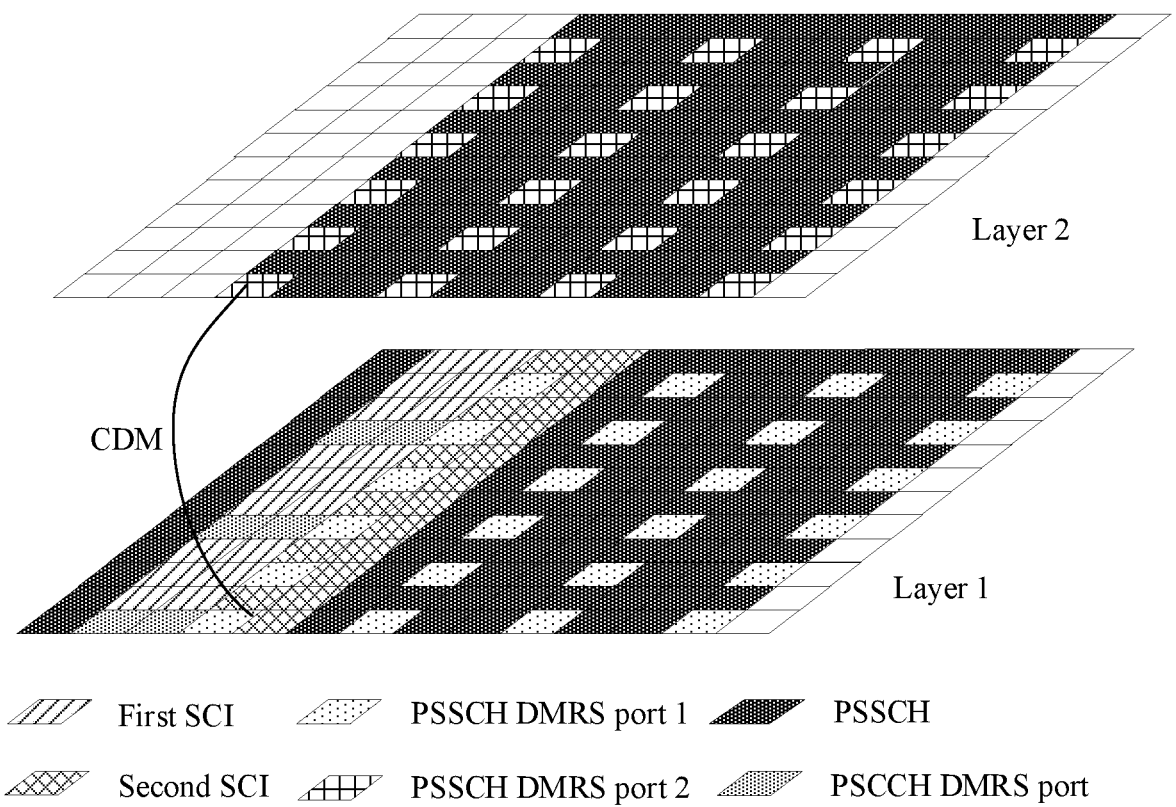
FIG. 8 is a sixth schematic application diagram of a method according to an embodiment of this disclosure.

(b) In a case of two-port transmission as shown in FIG. 7 or FIG. 8, and CDM mapping used for a two-port DMRS of the PSSCH, i. Rate-matching or puncturing is performed on the PSSCH for time-frequency resources for the second SCI (as shown in FIG. 7). To be specific, the second SCI is transmitted only at a single layer, no PSSCH data is mapped onto time-frequency resources corresponding to the SCI at the two layers of PSSCH. In this example, the second SCI is mapped only onto the fourth and fifth symbols of layer 1, and no data of the PSSCH is mapped onto the fourth and fifth symbols of both layer 1 and layer 2. A ratio beta of the EPRE of the second SCI to the EPRE of the PSSCH DMRS is 3 dB; or ii. Rate-matching or puncturing is performed on the PSSCH for time-frequency resources at a layer mapped by the second SCI (as shown in FIG. 8). To be specific, the second SCI is transmitted only at a single layer, the second SCI and PSSCH are encoded, bit interleaved and/or concatenated, then modulated, and the like, and the modulated information is mapped onto two layers, so that the second SCI is mapped onto an associated PSSCH layer (layer 1)/DMRS port. In this example, the second SCI is mapped only onto the fourth and fifth symbols of layer 1, data of the PSSCH is mapped onto the fifth symbol of layer 2, and data of the PSSCH is mapped onto the fourth and fifth symbols of layer 2. A ratio beta of the EPRE of the second SCI to the EPRE of the PSSCH DMRS is 0 dB.

In this scenario, a DMRS power of PSSCH DMRS port 1 used by a receiving-side terminal to demodulate the second SCI is related to the number of layers for the PSSCH. Before demodulation of the second SCI, the number of layers for the PSSCH and/or the DMRS configuration can be obtained from the first SCI, thereby determining the DMRS power.

The receiving-side terminal receives and demodulates the first SCI, and obtains the configuration of the PSSCH DMRS and/or the number of layers for the PSSCH. Subsequently, the receiving-side terminal obtains a power and a pattern of the layer 1 DMRS, starts to monitor the second SCI from the fourth symbol, and demodulates the second SCI based on the layer 1 DMRS. Further, additional scheduling information of the PSSCH is obtained for demodulation of the PSSCH.

Scenario 3: Time domain resources for the first SCI pre-configured by a network are a second symbol and a third symbol. The first SCI starts from the second symbol and is mapped onto assigned available resources in time-first manner. A configuration of a PSSCH DMRS is provided in the first SCI, and a multiplexing mode of CDM is used. The second SCI is predefined to be transmitted on the PSSCH layer 1, and a mapped layer and port are predefined. A pattern of a PSSCH DMRS predefined by a protocol/configured by a network is 1-symbol DMRS, type 1 configuration. The configuration of the DMRS used by the second SCI is the same as the configuration of the PSSCH DMRS. For example, the DMRS used by the second SCI is the first DMRS of the PSSCH.

When it is determined that the first location is a symbol at which the first DMRS configured for the PSSCH is located, mapping of the second SCI starts from the symbol at which the first DMRS configured for the PSSCH is located, and the mapping is performed on a predefined DMRS port/PSSCH layer (for example, layer 1). A ratio beta of the EPRE of the second SCI to the EPRE of the PSSCH DMRS is 0 dB, as shown in FIG. 6.

The receiving-side terminal receives and demodulates the first SCI, and obtains the configuration of the PSSCH DMRS to know that the PSSCH DMRS is CDM multiplexed, so that the receiving-side terminal receives the second SCI at layer 1 corresponding to a PSSCH DMRS port, and starts to monitor the second SCI from the fourth symbol.

In a case that a configuration of a PSSCH DMRS is provided in the first SCI, and a multiplexing mode of FDM is used, when it is determined that the first location is a symbol next to a first DMRS configured for the PSSCH, mapping of the second SCI starts from a symbol next to the first DMRS configured for the PSSCH, and the mapping is performed on a predefined DMRS port/PSSCH layer (for example, layer 1). A ratio beta of the EPRE of the second SCI to the EPRE of the PSSCH DMRS is 0 dB, as shown in FIG. 4. In this case, the receiving-side terminal receives and demodulates the first SCI, and obtains the configuration of the PSSCH DMRS to know that the PSSCH DMRS is FDM multiplexed, so that the receiving-side terminal receives the second SCI at layer 1 corresponding to a PSSCH DMRS port, and starts to monitor the second SCI from the fifth symbol.

In this scenario, the DMRS is flexibly configurable, may be in FDM or CDM multiplexing mode. UE may use a corresponding mapping rule for the second SCI according to the multiplexing mode.

Scenario 4: Time domain resources for the first SCI pre-configured by a network are a second symbol and a third symbol. The first SCI starts from the second symbol and is mapped onto assigned available resources in time-first manner. A configuration of a PSSCH DMRS is provided in the first SCI, and the PSSCH uses a two-layer transmission. The number of layers mapped by the second SCI is predefined to be the same as the number of layers for the PSSCH (that is, the SCI is transmitted in two layers), or the first SCI indicates that the second SCI uses a two-layer transmission. A pattern of a PSSCH DMRS predefined by a protocol/configured by a network is 1-symbol DMRS, type 1 configuration. The configuration of the DMRS used by the second SCI is the same as the configuration of the PSSCH DMRS. For example, the DMRS used by the second SCI is the first DMRS of the PSSCH.

When it is determined that the first location is a symbol at which the first DMRS configured for the PSSCH is located or a symbol next to the symbol at which a first DMRS configured for the PSSCH is located, mapping of the second SCI starts from a symbol at which the first DMRS configured for the PSSCH is located or from a symbol next to the symbol at which the first DMRS configured for the PSSCH is located.

Figure 9:
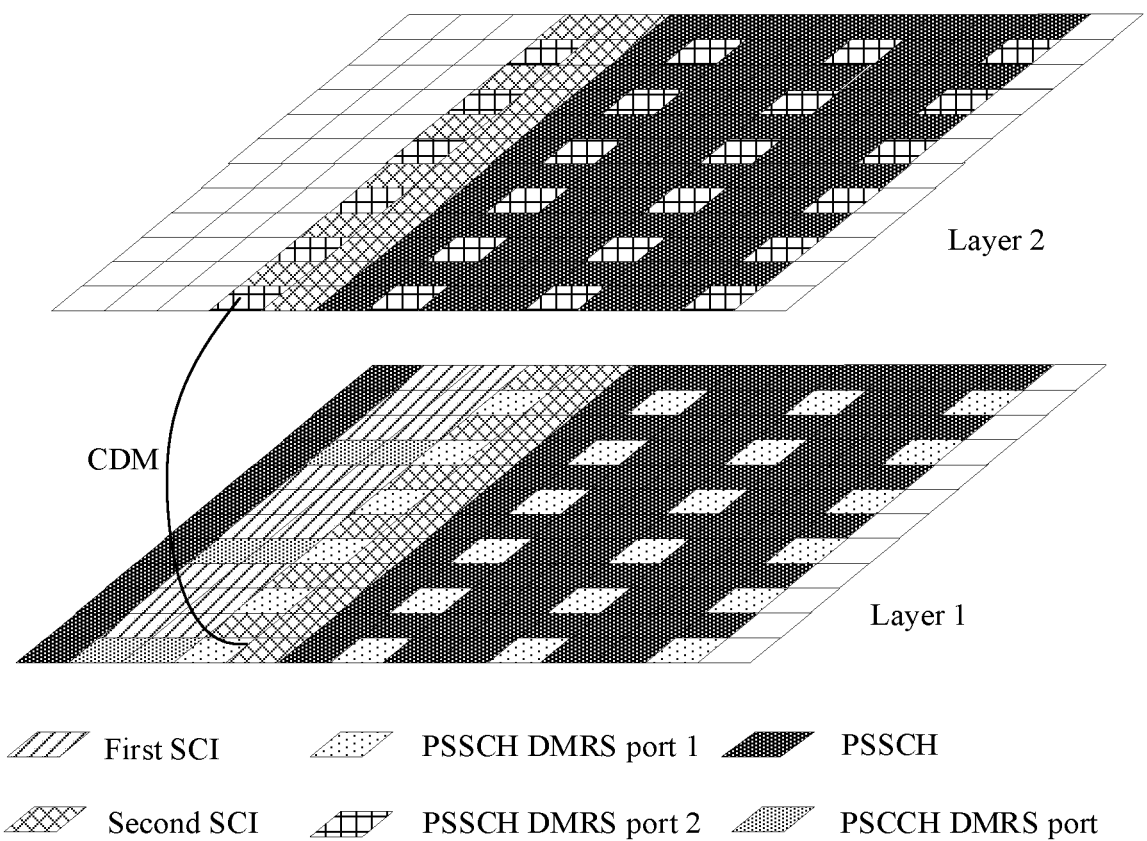
FIG. 9 is a seventh schematic application diagram of a method according to an embodiment of this disclosure.

(a) In a case that as shown in FIG. 9, the PSSCH DMRS is CDM multiplexed, mapping of the second SCI starts from the symbol at which the first DMRS configured for the PSSCH is located, and the mapping is performed at two layers for the PSSCH. To be specific, the second SCI and PSSCH are encoded, bit interleaved and/or concatenated, then modulated, and the like, and the modulated information is mapped onto two layers, so that the second SCI is mapped onto corresponding locations of two layers for the PSSCH (the fourth and fifth symbols of layer 1 and layer 2). A ratio beta of the EPRE of the second SCI to the EPRE of the PSSCH DMRS is 0 dB.

Figure 10:
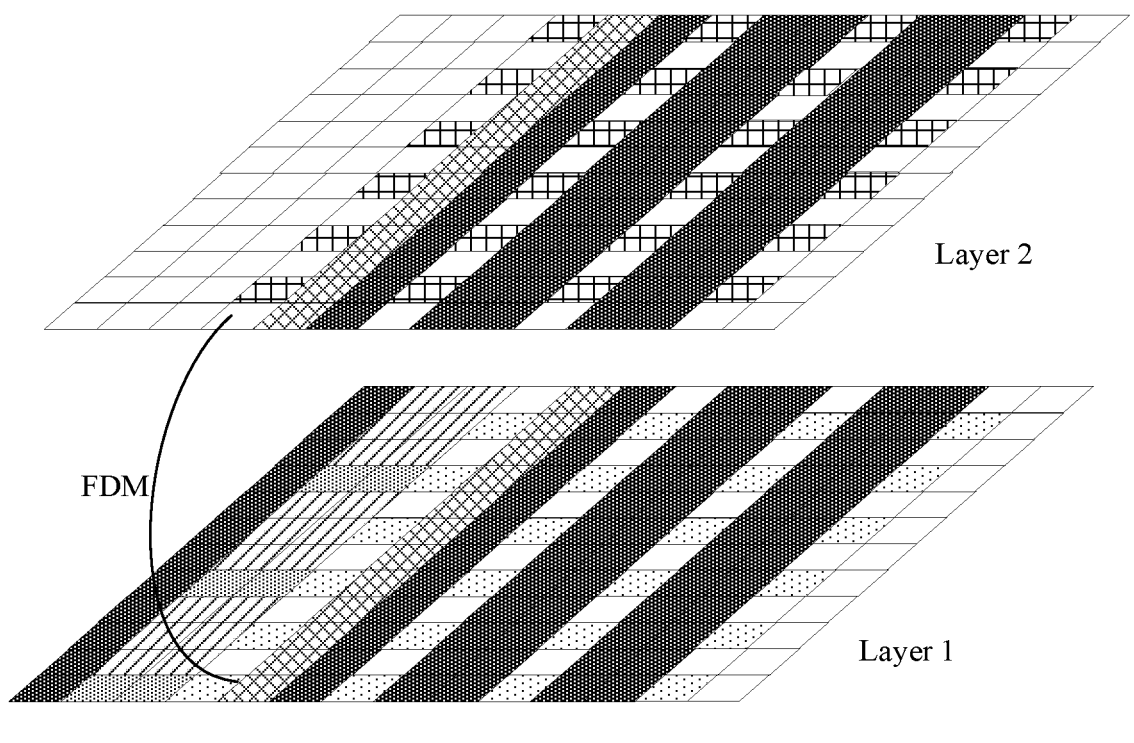
FIG. 10 is an eighth schematic application diagram of a method according to an embodiment of this disclosure.

(b) In a case that as shown in FIG. 10, the PSSCH DMRS is FDM multiplexed, mapping of the second SCI starts from a symbol next to the first DMRS configured for the PSSCH, and the mapping is performed at two layers for the PSSCH. To be specific, the second SCI and PSSCH are encoded, bit interleaved and/or concatenated, then modulated, and the like, and the modulated information is mapped onto two layers, so that the second SCI is mapped onto corresponding locations of two layers for the PSSCH (the fifth symbols of layer 1 and layer 2). A ratio beta of the EPRE of the second SCI to the EPRE of the PSSCH DMRS is −3 dB.

Scenario 5: Time domain resources for the first SCI pre-configured by a network are a second symbol and a third symbol. The first SCI starts from the second symbol and is mapped onto assigned available resources in time-first manner.

Figure 11:
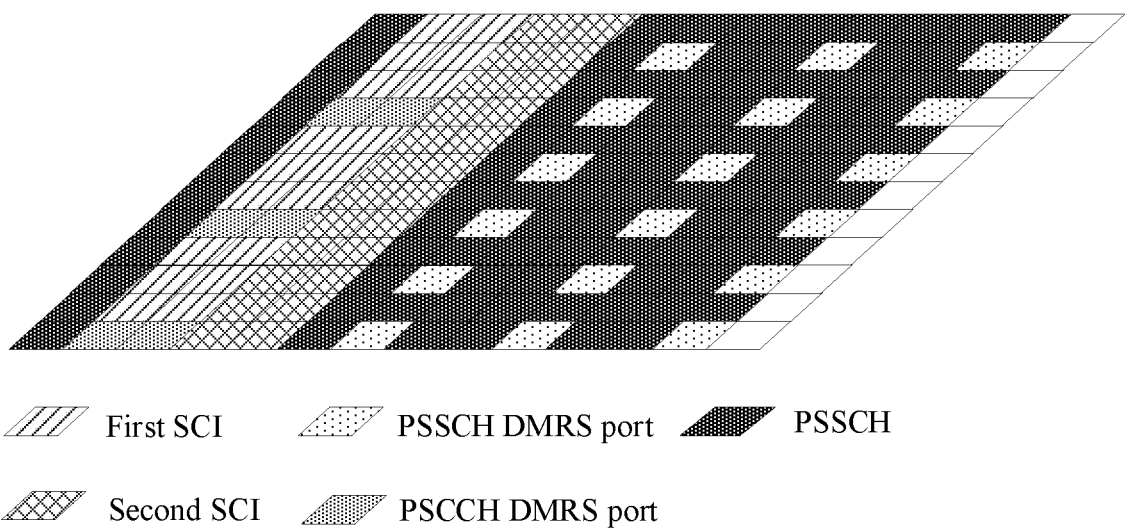
FIG. 11 is a ninth schematic application diagram of a method according to an embodiment of this disclosure.
Figure 12:
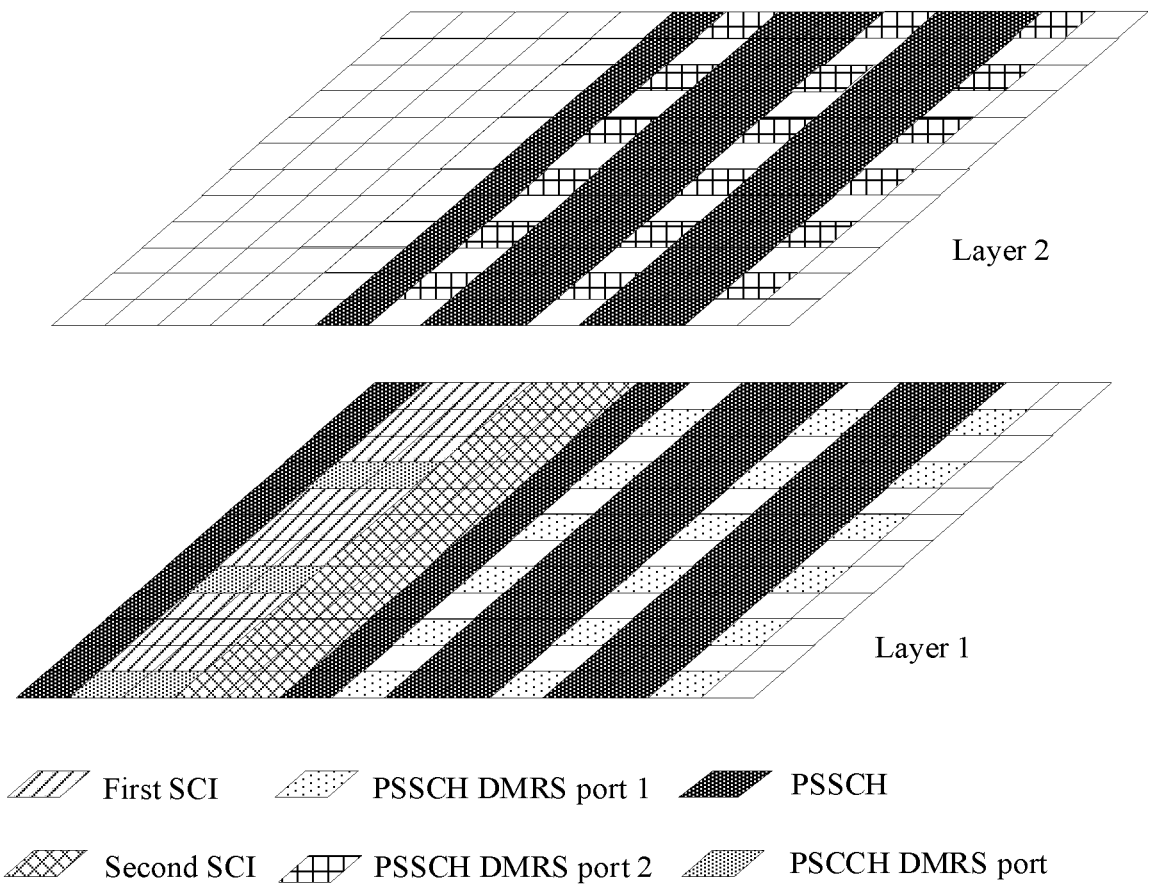
FIG. 12 is a tenth schematic application diagram of a method according to an embodiment of this disclosure.

When it is determined that a first location is the first symbol after the first SCI, mapping of the second SCI starts from the fourth symbol (the first symbol after the first SCI). In a case of single-port transmission as shown in FIG. 11, a ratio beta of an EPRE of the second SCI to an EPRE of the PSCCH DMRS is 0 dB. In a case of two-port transmission as shown in FIG. 12, a ratio beta of the EPRE of the second SCI to the EPRE of the PSCCH DMRS is 3 dB.

The receiving-side terminal uses the DMRS of the first SCI to demodulate the second SCI.

Scenario 6: Time domain resources for the first SCI pre-configured by a network are a second symbol and a third symbol. The first SCI starts from the second symbol and is mapped onto assigned available resources in time-first manner. The first SCI indicates that the number of layers for the second SCI is one layer, or the first SCI indicates that the number of layers for the PSSCH is one layer, and that the number of layers for the second SCI is the same as that for the PSSCH (that is, the number of layers for the second SCI is one layer). A configuration of a DMRS used by the second SCI may be defined separately, for example, the DMRS used by the second SCI is mapped in a comb 4 fashion.

Figure 13:
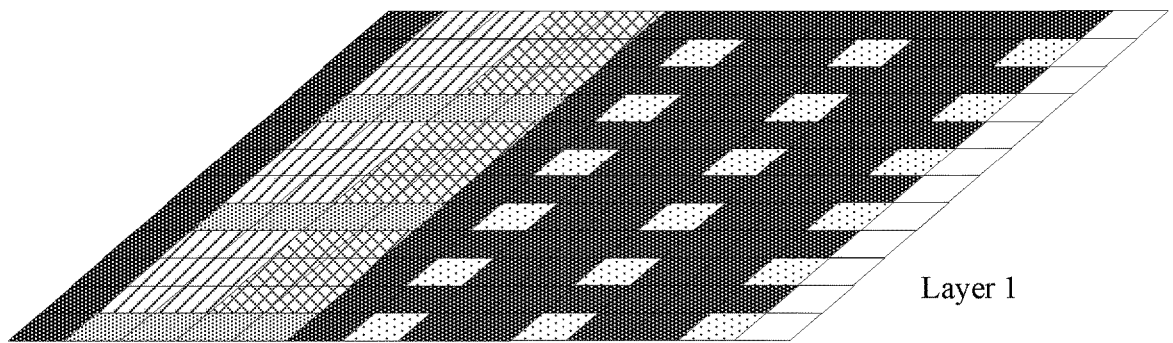
FIG. 13 is an eleventh schematic application diagram of a method according to an embodiment of this disclosure.

When it is determined that a first location is the first symbol after the first SCI, mapping of the second SCI starts from the fourth symbol (the first symbol after the first SCI) at layer 1, as shown in FIG. 13.

The receiving-side terminal demodulates the first SCI to obtain the number of layers for the second SCI. According to the number of layers for the second SCI and a separately defined DMRS, the second SCI is demodulated.

Figure 14:
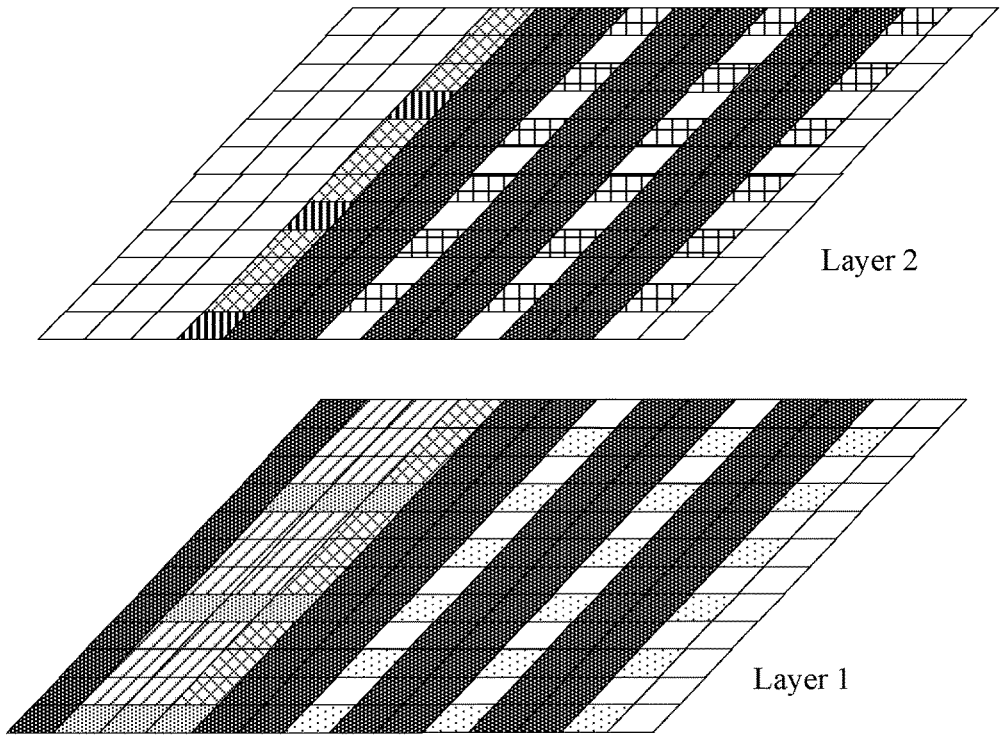
FIG. 14 is a twelfth schematic application diagram of a method according to an embodiment of this disclosure.

In a case that the first SCI indicates that the number of layers for the second SCI is two layers, or the first SCI indicates that the number of layers for the PSSCH is two layers, and that the number of layers for the second SCI is the same as that for the PSSCH (that is, the number of layers for the second SCI is two layers), when it is determined that a first location is the first symbol after the first SCI, mapping of the second SCI starts from the fourth symbol (the first symbol after the first SCI) on two layers, as shown in FIG. 14. The receiving-side terminal demodulates the first SCI to obtain the number of layers for the second SCI. According to the number of layers for the second SCI and a separately defined DMRS, the second SCI is demodulated.

Certainly, the foregoing scenarios are described in the case of scheduling the PSSCH by two-stage SCI, but the same applies to a case of transmitting SFCI when a PSSCH is scheduled by one-stage SCI.

To sum up, in the method according to the embodiments of this disclosure, the SCI and target control information are transmitted according to the resource mapping pattern (for indicating the PSSCH scheduled by the SCI and the transmission resource for the target control information), to implement transmission of the target control information to a peer terminal, which ensures performance of the SCI or SFCI and also improves PSSCH demodulation performance and system capacity.

Figure 15:
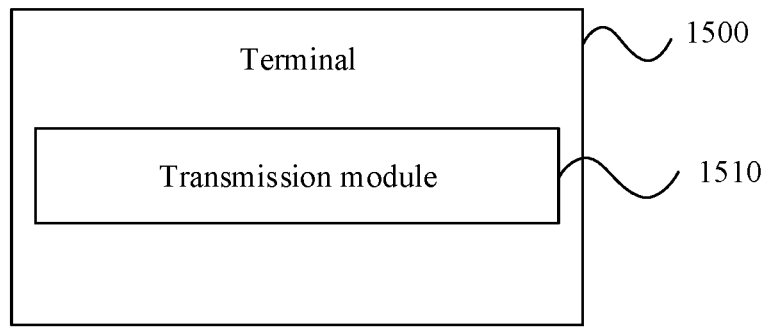
FIG. 15 is a schematic structural diagram of a terminal according to an embodiment of this disclosure.

FIG. 15 is a block diagram of a terminal device according to an embodiment of this disclosure. The terminal 1500 shown in FIG. 15 includes a transmission module 1510.

The transmission module 1510 is configured to transmit sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

Optionally, in the resource mapping pattern, mapping of the target control information starts in time domain from a first location and starts in frequency domain from a second location.

The first location and/or the second location is determined based on at least one of the following information:
  location of a PSSCH demodulation reference signal DMRS;
  transmission configuration parameter;
  number of layers for a PSSCH;
  configuration of a DMRS in use;
  configuration information for SFCI;
  transmitted service type;
  resource assigned for a PSSCH; and
  resource configuration for SCI.

Optionally, the location of a PSSCH DMRS is:
  a location of the N-th DMRS or the N-th DMRS set of the PSSCH, where N is an integer greater than or equal to 1; or
  a location of a front-loaded DMRS in the PSSCH.

Optionally, the transmission configuration parameter includes at least one of the following: number of layers, payload, and code rate.

Optionally, the configuration of a DMRS in use includes at least one of the following: DMRS type, number of symbols, and multiplexing mode.

Optionally, the configuration information for SFCI includes: whether SFCI is carried.

In a case that SFCI is carried, the configuration information for SFCI further includes: a transmission resource for SFCI and/or a size of information carried by SFCI.

Optionally, the transmitted service type includes: groupcast, unicast, or broadcast.

Optionally, the resource assigned for a PSSCH includes a frequency-domain resource assigned for the PSSCH and/or a time-domain resource assigned for the PSSCH.

Optionally, in the resource mapping pattern, mapping of the target control information at a target layer starts in time domain from a first location and starts in frequency domain from a second location; where the target layer is a single layer or multiple layers.

Optionally, the target layer is predefined or indicated by the SCI.

Optionally, the number of layers for a target layer is predefined or indicated by the SCI, and related to the number of layers for a PSSCH or a physical sidelink control channel PSCCH.

Optionally, in the resource mapping pattern, mapping of the target control information starts in time domain from a symbol at which the N-th DMRS or N-th DMRS set or front-loaded DMRS of the PSSCH is located, or from the L-th symbol after a symbol at which the N-th DMRS or N-th DMRS set or front-loaded DMRS of the PSSCH is located, and starts in frequency domain from the M-th physical resource block PRB of PRBs assigned for the PSSCH; where the M-th PRB is a PRB with a highest index, or a PRB with a lowest index, or an edge PRB in a target frequency-domain range, M is an integer greater than or equal to 1, and L is an integer greater than or equal to 1.

Optionally, in the resource mapping pattern, mapping of the target control information starts in time domain from the P-th symbol after the SCI and starts in frequency domain from the Q-th PRB of the SCI; where Q is an integer greater than or equal to 1, and P is an integer greater than or equal to 1.

Optionally, in the resource mapping pattern, mapping of the target control information starts in time domain from a first available symbol, or a first available symbol not carrying DMRS, assigned for the PSSCH.

Optionally, in the resource mapping pattern, in a case that SFCI is carried, rate matching or puncturing is performed on a location of the SFCI during mapping of the next-stage SCI.

Optionally, in a case that the transmitted service type is groupcast or unicast, in the resource mapping pattern, rate matching or puncturing is performed on a location of the SFCI during mapping of the next-stage SCI.

Optionally, the target control information is correspondingly provided with configurations of one or more DMRSs, where
  when the target control information is correspondingly provided with configurations of a plurality of DMRSs, a configuration of a DMRS in use is predefined or determined based on the SCI.

Optionally, a configuration of a DMRS used by the target control information is predefined or indicated by the SCI, different from a configuration of a PSSCH DMRS.

Optionally, a configuration of a PSSCH DMRS and/or the number of layers for a PSSCH is indicated in the SCI or the next-stage SCI.

Optionally, a ratio of an energy per resource element EPRE of the target control information to an EPRE of a DMRS in use is determined based on at least one of the following information:
  type of the DMRS in use;
  multiplexing mode of the DMRS in use;
  number of code division multiplexing CDM groups of the DMRS in use;
  number of layers for the target control information;
  number of layers for the PSSCH;
  time-frequency resource location of the PSSCH; and
  mapping mode of data on the PSSCH.

It should be noted that the terminal is a terminal to which the information transmission method of the foregoing embodiment is applied, and the implementation of the information transmission method of the foregoing embodiment is applicable to the terminal, with the same technical effects achieved.

The terminal 1500 can implement the processes implemented by the terminal in the embodiments shown in FIG. 2 to FIG. 14. To avoid repetition, details are not described again herein. The terminal in the embodiments of this disclosure can transmit the SCI and the target control information according to the resource mapping pattern (for indicating the PSSCH scheduled by the SCI and the transmission resource for the target control information), which ensures performance of the SCI or SFCI and also improves PSSCH demodulation performance and system capacity.

Figure 16:
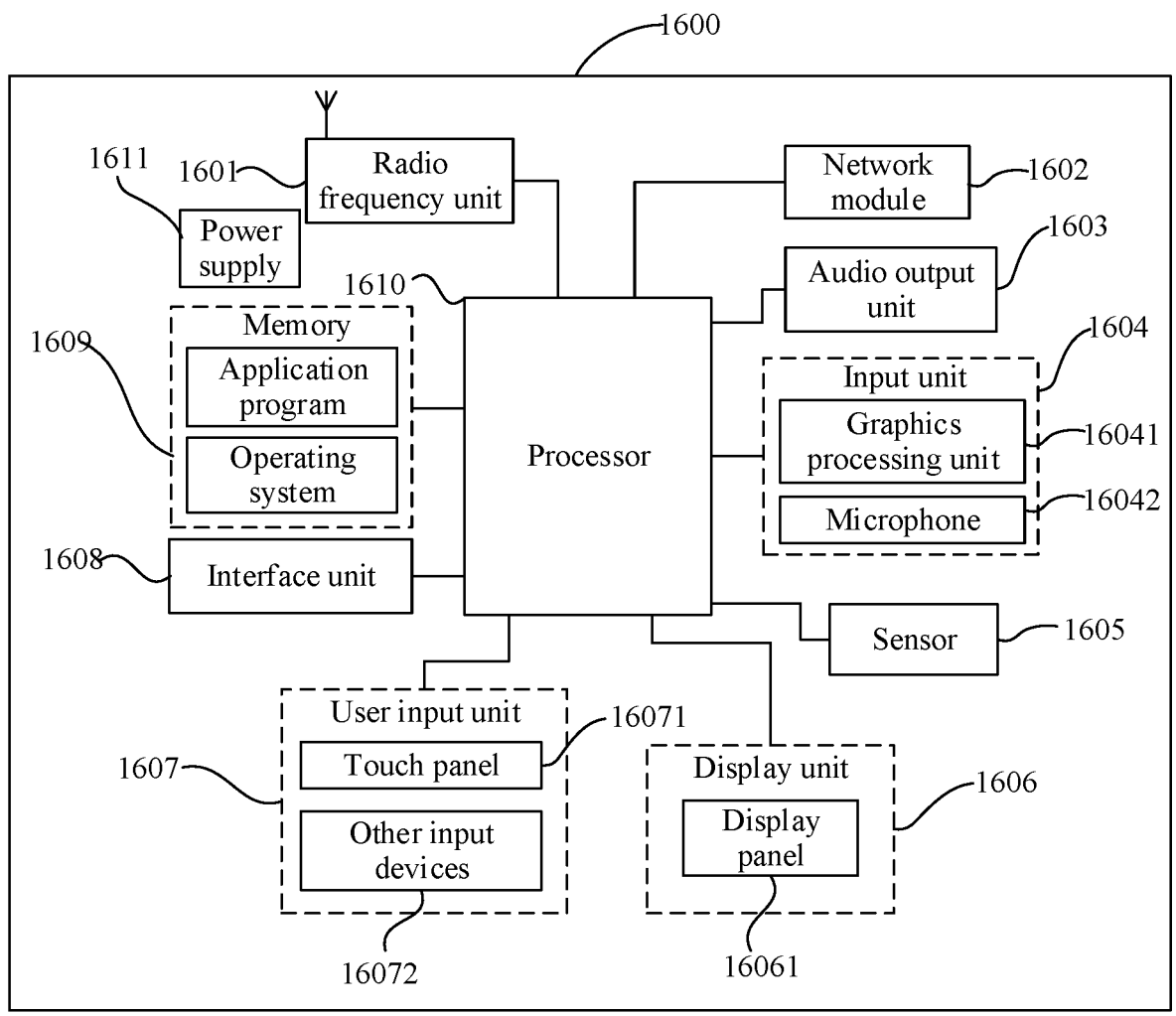
FIG. 16 is a schematic structural diagram of a terminal according to another embodiment of this disclosure.

FIG. 16 is a schematic diagram of a hardware structure of a terminal for implementing the embodiments of this disclosure. The terminal 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, a processor 1610, and a power supply 1611. A person skilled in the art can understand that the structure of the terminal shown in FIG. 16 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 1601 is configured to transmit sidelink control information SCI and target control information according to a resource mapping pattern; where the resource mapping pattern is used to indicate transmission resources for a physical sidelink shared channel PSSCH scheduled by the SCI and for the target control information, and the target control information is next-stage SCI or sidelink feedback control information SFCI.

In this way, the terminal can transmit the SCI and the target control information (next-stage SCI or SFCI) according to the resource mapping pattern (for indicating the PSSCH scheduled by the SCI and the transmission resource for the target control information), which ensures performance of the SCI or SFCI and also improves PSSCH demodulation performance and system capacity.

It should be understood that, in this embodiment of this disclosure, the radio frequency unit 1601 may be configured to transmit or receive a signal in an information transmitting/receiving or call process. Specifically, the radio frequency unit 1601 receives downlink data from a base station, transmits the downlink data to the processor 1610 for processing, and transmits uplink data to the base station. Generally, the radio frequency unit 1601 includes but is not limited to an antenna, at least one amplifier, a transceiver, a coupler, a low noise amplifier, a duplexer, and the like. In addition, the radio frequency unit 1601 may also communicate with a network and other devices via a wireless communications system.

The terminal provides a user with wireless broadband Internet access by using the network module 1602, for example, helping the user to transmit and receive e-mails, browse web pages, and access streaming media.

The audio output unit 1603 may convert audio data received by the radio frequency unit 1601 or the network module 1602 or stored in the memory 1609 into an audio signal, and output the audio signal as a sound. In addition, the audio output unit 1603 may further provide audio output (for example, a call signal received tone or a message received tone) that is related to a specific function performed by the terminal 1600. The audio output unit 1603 includes a speaker, a buzzer, a receiver, and the like.

The input unit 1604 is configured to receive an audio or video signal. The input unit 1604 may include a graphics processing unit (GPU) 16041 and a microphone 16042, and the graphics processing unit 16041 processes image data of a still picture or a video obtained by an image capture apparatus (for example, a camera) in an image capture mode or a video capture mode. A processed image frame may be displayed on the display unit 1606. The image frame processed by the graphics processing unit 16041 may be stored in the memory 1609 (or another storage medium) or transmitted by using the radio frequency unit 1601 or the network module 1602. The microphone 16042 is capable of receiving sounds and processing such sounds into audio data. The processed audio data can be converted into a format output that can be transmitted to a mobile communication base station through the radio frequency unit 1601 in a telephone call mode.

The terminal 1600 further includes at least one sensor 1605, for example, an optical sensor, a motion sensor, and other sensors. Specifically, the optical sensor may include an ambient light sensor and a proximity sensor. The ambient light sensor may adjust luminance of the display panel 16061 based on brightness of ambient light, and the proximity sensor may turn off a display panel 16061 and/or backlight when the terminal 1600 moves close to an ear. As a motion sensor, an accelerometer sensor may detect a value of an acceleration in various directions (there are usually three axes), may detect a value and a direction of gravity when the terminal is still, and may be applied to terminal posture recognition (for example, landscape/portrait mode switching, related games, and magnetometer posture calibration), functions related to vibration recognition (for example, a pedometer or a tapping), and the like. The sensor 1605 may further include a fingerprint sensor, a pressure sensor, an iris sensor, a molecular sensor, a gyroscope, a barometer, a hygrometer, a thermometer, or an infrared sensor. Details are not described herein.

The display unit 1606 is configured to display information input by the user or information provided for the user. The display unit 1606 may include the display panel 16061. The display panel 16061 may be configured in a form of a liquid crystal display (LCD), an organic light-emitting diode (OLED), or the like.

The user input unit 1607 may be used to receive input digit or character information, and generate key signal input that is related to user setting and function control of the terminal. Specifically, the user input unit 1607 includes a touch panel 16071 and other input devices 16072. The touch panel 16071, also referred to as a touchscreen, may capture a touch operation performed by a user on or near the touch panel (for example, an operation performed by the user on the touch panel 16071 or near the touch panel 16071 by using a finger or any appropriate object or accessory such as a stylus). The touch panel 16071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 1610, receives a command transmitted by the processor 1610, and executes the command In addition, the touch panel 16071 may be implemented in a plurality of forms, for example, as a resistive, capacitive, infrared, or surface acoustic wave touch panel. In addition to the touch panel 16071, the user input unit 1607 may further include other input devices 16072. Specifically, the other input devices 16072 may include but are not limited to a physical keyboard, a function key (for example, a volume control key or a switch key), a trackball, a mouse, and a joystick. Details are not described herein.

Further, the touch panel 16071 may cover the display panel 16061. When detecting a touch operation on or near the touch panel 16071, the touch panel 16071 transmits the touch operation to the processor 1610 for determining a type of the touch event. Then, the processor 1610 provides a corresponding visual output on the display panel 16061 based on the type of the touch event. Although in FIG. 16, the touch panel 16071 and the display panel 16061 act as two independent parts to implement input and output functions of the terminal, in some embodiments, the touch panel 16071 and the display panel 16061 may be integrated to implement the input and output functions of the terminal. This is not specifically limited herein.

The interface unit 1608 is an interface between an external apparatus and the terminal 1600. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 1608 may be configured to receive an input (for example, data information or power) from the external apparatus and transmit the received input to one or more elements within the terminal 1600, or may be configured to transmit data between the terminal 1600 and the external apparatus.

The memory 1609 may be configured to store software programs and various data. The memory 1609 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 1609 may include a high-speed random access memory, and may further include a non-volatile memory such as a disk storage device, a flash memory device, or another volatile solid-state storage device.

The processor 1610 is a control center of the terminal, and is connected to all components of the terminal by using various interfaces and lines. By running or executing software programs and/or modules that are stored in the memory 1609 and calling data stored in the memory 1609, the processor 1610 executes various functions of the terminal and processes data, so as to perform overall monitoring on the terminal. The processor 1610 may include one or more processing units. Optionally, the processor 1610 may integrate an application processor and a modem processor. The application processor mainly processes an operating system, a user interface, an application program, and the like. The modem processor mainly processes wireless communication. It may be understood that the modem processor may alternatively not be integrated in the processor 1610.

The terminal 1600 may further include a power supply 1611 (for example, a battery) that supplies power to the components. Optionally, the power supply 1611 may be logically connected to the processor 1610 by using a power management system, so as to implement functions such as charging management, discharging management, and power consumption management by using the power management system.

In addition, the terminal 1600 includes some functional modules that are not shown. Details are not described herein again.

Optionally, an embodiment of the present disclosure further provides a terminal, including a processor, a memory, and a computer program stored in the memory and capable of running on the processor. When the computer program is executed by the processor, each process of the foregoing embodiment of the information transmission method is implemented, with the same technical effects achieved. To avoid repetition, details are not described herein again.

An embodiment of this disclosure further provides a computer-readable storage medium, where the computer-readable storage medium stores a computer program. When the computer program is executed by a processor, each processes of the foregoing information transmission method embodiment are implemented, with the same technical effect achieved. To avoid repetition, details are not described herein again. For example, the computer-readable storage medium is a read-only memory (ROM), a random access memory (RAM), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An information transmission method, performed by a terminal, comprising:
transmitting sidelink control information SCI and target control information according to a resource mapping pattern;
wherein the resource mapping pattern is used to indicate transmission resources for a physical sidelink shared channel PSSCH scheduled by the SCI and for the target control information, and the target control information is next-stage SCI or sidelink feedback control information SFCI;
when the target control information is the next-stage SCI, in the resource mapping pattern, mapping of the next-stage SCI starts in time domain from a first location and starts in frequency domain from a second location; the first location is determined based on location of a PSSCH demodulation reference signal (DMRS), and the second location is determined based on resource assigned for a PSSCH;
or,
when the target control information is the SFCI, in the resource mapping pattern, mapping of the SFCI starts in time domain from a first location which is determined based on resource assigned for a PSSCH.

2. The method according to claim 1, wherein the location of the PSSCH DMRS is:
a location of the N-th DMRS or the N-th DMRS set of the PSSCH, wherein N is an integer greater than or equal to 1; or
a location of a front-loaded DMRS in the PSSCH.

3. The method according to claim 1, wherein the resource assigned for a PSSCH comprises a frequency-domain resource assigned for the PSSCH and/or a time-domain resource assigned for the PSSCH.

4. The method according to claim 1, wherein in the resource mapping pattern,
mapping of the target control information at a target layer starts in time domain from the first location and starts in frequency domain from the second location; wherein the target layer is a single layer or multiple layers.

5. The method according to claim 4, wherein the target layer is predefined or indicated by the SCI.

6. The method according to claim 1, wherein in the resource mapping pattern,
mapping of the target control information starts in time domain from a symbol at which the N-th DMRS of the PSSCH is located, and starts in frequency domain from the M-th physical resource block PRB of PRBs assigned for the PSSCH; wherein the M-th PRB is a PRB with a lowest index, M is an integer greater than or equal to 1.

7. The method according to claim 1, wherein in the resource mapping pattern, in a case that SFCI is carried, rate matching or puncturing is performed on a location of the SFCI during mapping of the next-stage SCI; or,
wherein in a case that a transmitted service type is groupcast or unicast, in the resource mapping pattern, rate matching or puncturing is performed on a location of the SFCI during mapping of the next-stage SCI.

8. The method according to claim 1, wherein the target control information is correspondingly provided with configurations of one or more DMRSs; wherein
when the target control information is correspondingly provided with configurations of a plurality of DMRSs, a configuration of a DMRS in use is predefined or determined based on the SCI.

9. The method according to claim 1, wherein a configuration of a DMRS used by the target control information is predefined or indicated by the SCI, and is the same as a configuration of a PSSCH DMRS.

10. The method according to claim 1, wherein the SCI or the next-stage SCI indicates a configuration of the PSSCH DMRS and/or the number of layers for a PSSCH.

11. The method according to claim 1, wherein a ratio of an energy per resource element EPRE of the target control information to an EPRE of a DMRS in use is determined based on at least one of the following information:
type of the DMRS in use;
multiplexing mode of the DMRS in use;
number of code division multiplexing CDM groups of the DMRS in use.

12. A terminal, comprising a processor, a memory, and a program stored in the memory and capable of running on the processor, wherein when the program is executed by the processor, the steps of an information transmission method are implemented, wherein the information transmission method comprises:
transmitting sidelink control information SCI and target control information according to a resource mapping pattern;
wherein the resource mapping pattern is used to indicate transmission resources for a physical sidelink shared channel PSSCH scheduled by the SCI and for the target control information, and the target control information is next-stage SCI or sidelink feedback control information SFCI;
when the target control information is the next-stage SCI, in the resource mapping pattern, mapping of the next-stage SCI starts in time domain from a first location and starts in frequency domain from a second location; the first location is determined based on location of a PSSCH demodulation reference signal (DMRS), and the second location is determined based on resource assigned for a PSSCH;
or,
when the target control information is the SFCI, in the resource mapping pattern, mapping of the SFCI starts in time domain from a first location which is determined based on resource assigned for a PSSCH.

13. The terminal according to claim 12, wherein the location of the PSSCH DMRS is:
a location of the N-th DMRS or the N-th DMRS set of the PSSCH, wherein N is an integer greater than or equal to 1; or
a location of a front-loaded DMRS in the PSSCH.

14. The terminal according to claim 12, wherein the resource assigned for a PSSCH comprises a frequency-domain resource assigned for the PSSCH and/or a time-domain resource assigned for the PSSCH.

15. The terminal according to claim 12, wherein in the resource mapping pattern,
mapping of the target control information at a target layer starts in time domain from the first location and starts in frequency domain from the second location; wherein the target layer is a single layer or multiple layers.

16. The terminal according to claim 12, wherein in the resource mapping pattern,
mapping of the target control information starts in time domain from a symbol at which the N-th DMRS of the PSSCH is located, and starts in frequency domain from the M-th physical resource block PRB of PRBs assigned for the PSSCH; wherein the M-th PRB is a PRB with a lowest index, M is an integer greater than or equal to 1.

17. A non-transitory computer-readable storage medium, wherein the non-transitory computer-readable storage medium stores a program, and when the program is executed by a processor, the steps of an information transmission method are implemented, wherein the information transmission method comprises:
transmitting sidelink control information SCI and target control information according to a resource mapping pattern;
wherein the resource mapping pattern is used to indicate transmission resources for a physical sidelink shared channel PSSCH scheduled by the SCI and for the target control information, and the target control information is next-stage SCI or sidelink feedback control information SFCI;
when the target control information is the next-stage SCI, in the resource mapping pattern, mapping of the next-stage SCI starts in time domain from a first location and starts in frequency domain from a second location; the first location is determined based on location of a PSSCH demodulation reference signal (DMRS), and the second location is determined based on resource assigned for a PSSCH;

or, when the target control information is the SFCI, in the resource mapping pattern, mapping of the SFCI starts in time domain from a first location which is determined based on resource assigned for a PSSCH.

18. The non-transitory computer-readable storage medium according to claim 17, wherein the location of the PSSCH DMRS is:

a location of the N-th DMRS or the N-th DMRS set of the PSSCH, wherein N is an integer greater than or equal to 1; or a location of a front-loaded DMRS in the PSSCH.

19. The non-transitory computer-readable storage medium according to claim 17, wherein the resource assigned for a PSSCH comprises a frequency-domain resource assigned for the PSSCH and/or a time-domain resource assigned for the PSSCH.

20. The non-transitory computer-readable storage medium according to claim 17, wherein in the resource mapping pattern, mapping of the target control information at a target layer starts in time domain from the first location and starts in frequency domain from the second location; wherein the target layer is a single layer or multiple layers.

\* \* \* \* \*